(12) United States Patent
Terada et al.

(10) Patent No.: US 10,300,726 B2
(45) Date of Patent: May 28, 2019

(54) HEAT-SENSITIVE RECORDING MATERIAL HAVING INTERMEDIATE LAYER THAT CONTAINS HOLLOW PARTICLES

(71) Applicant: SAIDEN CHEMICAL INDUSTRY CO., LTD., Tokyo (JP)

(72) Inventors: Daichi Terada, Tokyo (JP); Koichi Watanabe, Saitama (JP); Shuichi Kanedai, Saitama (JP); Kenji Kijima, Saitama (JP); Junpei Kozuka, Saitama (JP)

(73) Assignee: SAIDEN CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/577,128

(22) PCT Filed: Jun. 3, 2016

(86) PCT No.: PCT/JP2016/066600
§ 371 (c)(1),
(2) Date: Nov. 27, 2017

(87) PCT Pub. No.: WO2016/195076
PCT Pub. Date: Dec. 8, 2016

(65) Prior Publication Data
US 2018/0201040 A1    Jul. 19, 2018

(30) Foreign Application Priority Data

Jun. 5, 2015    (JP) ................................ 2015-115120

(51) Int. Cl.
*B41M 5/44*    (2006.01)
*B41M 5/36*    (2006.01)
(Continued)

(52) U.S. Cl.
CPC .............. *B41M 5/44* (2013.01); *B41M 5/366* (2013.01); *C08F 285/00* (2013.01); *B41M 5/323* (2013.01);
(Continued)

(58) Field of Classification Search
CPC ...... B41M 5/323; B41M 5/333; B41M 5/366; B41M 5/44; B41M 2205/04; B41M 2205/38; B41M 2205/40
(Continued)

(56) References Cited

FOREIGN PATENT DOCUMENTS

JP    56-032513    4/1981
JP    59-005093    1/1984
(Continued)

OTHER PUBLICATIONS

International Search Report, issued in the corresponding International Application No. PCT/JP2016/066600, dated Aug. 16, 2016, 4 pages.
(Continued)

*Primary Examiner* — Bruce H Hess
(74) *Attorney, Agent, or Firm* — Hamre, Schumann, Mueller & Larson, P.C.

(57) ABSTRACT

The present invention provides a heat-sensitive recording body that is excellent in high-speed recording properties, that makes it possible to perform high-quality image recording with a high sensitivity even at a low thermal energy, and that is excellent in printability and economy. A heat-sensitive recording body containing a support, an intermediate layer, and a heat-sensitive color forming layer comprising as main components a leuco dye and a developer, the intermediate layer and the heat-sensitive color forming layer stacked on the support in the order as mentioned, wherein the intermediate layer contains a hollow particle containing a hollow core portion formed by drying a solvent for an alkali- (Continued)

swellable aqueous gel comprising a (meth)acrylic-based copolymer having an acid value of 200 to 400 mgKOH/g, and a resin portion encapsulating the core portion and having a non-alkali-swellable outermost layer of the particle, the non-alkali-swellable outermost layer formed using a hydrophobic monomer, and the hollow particle has an average particle diameter of 1.5 to 3.5 μm and a percentage of hollowness of 60 to 85%.

8 Claims, 3 Drawing Sheets

(51) Int. Cl.
C08F 285/00 (2006.01)
B41M 5/323 (2006.01)
B41M 5/333 (2006.01)

(52) U.S. Cl.
CPC ......... *B41M 5/333* (2013.01); *B41M 2205/04* (2013.01); *B41M 2205/36* (2013.01); *B41M 2205/38* (2013.01); *B41M 2205/40* (2013.01)

(58) Field of Classification Search
USPC .................................................. 503/207, 215
See application file for complete search history.

(56) References Cited

FOREIGN PATENT DOCUMENTS

| JP | 03-067735 | 10/1984 |
|---|---|---|
| JP | 63-213509 | 9/1988 |
| JP | 04-241987 | 8/1992 |
| JP | 05-008535 | 1/1993 |
| JP | 2002-105146 | 4/2002 |
| JP | 2002-241448 | 8/2002 |
| JP | 2004-106435 | 4/2004 |
| JP | 2010-094981 | 4/2010 |
| JP | 2012-056265 | 3/2012 |
| JP | 2013-230619 | 11/2013 |

OTHER PUBLICATIONS

First Chinese Office Action, issued in the corresponding Chinese patent application No. 201680032883.1, dated Oct. 31, 2018, 14 pages (including machine translation).

[Figure 1]
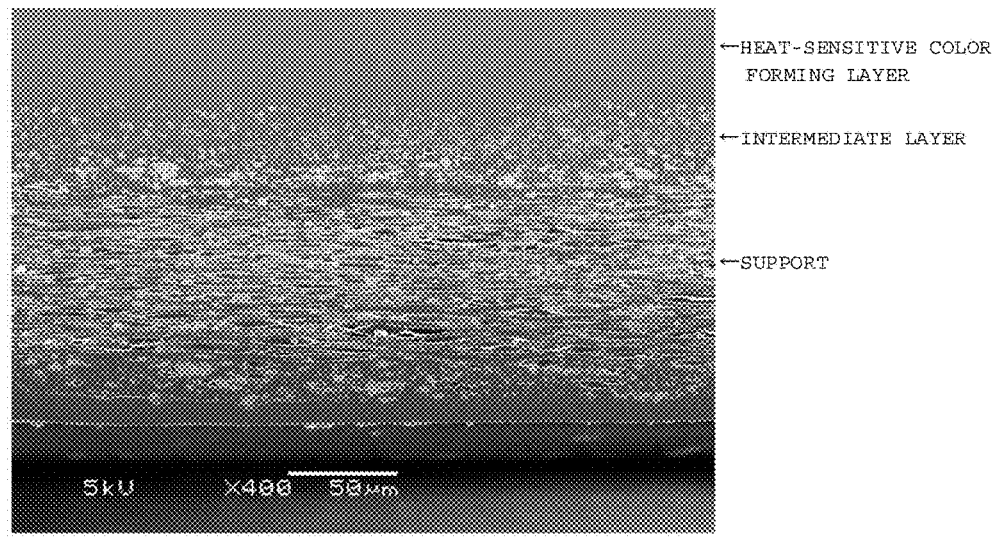
[Figure 2]
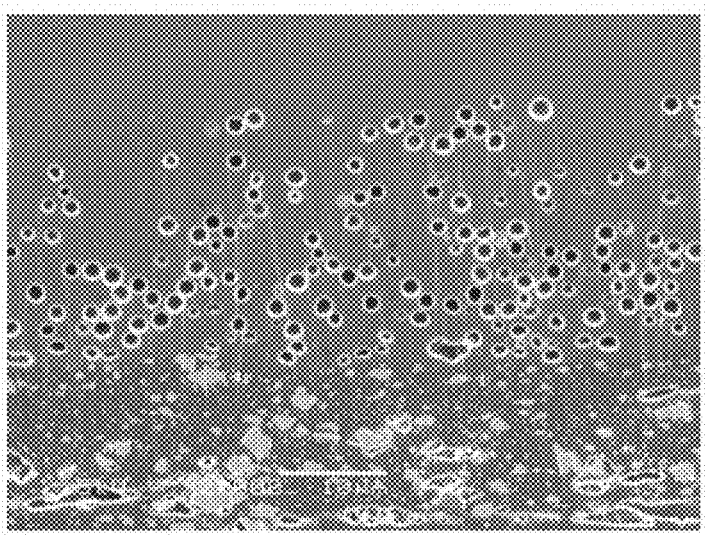

[Figure 3]
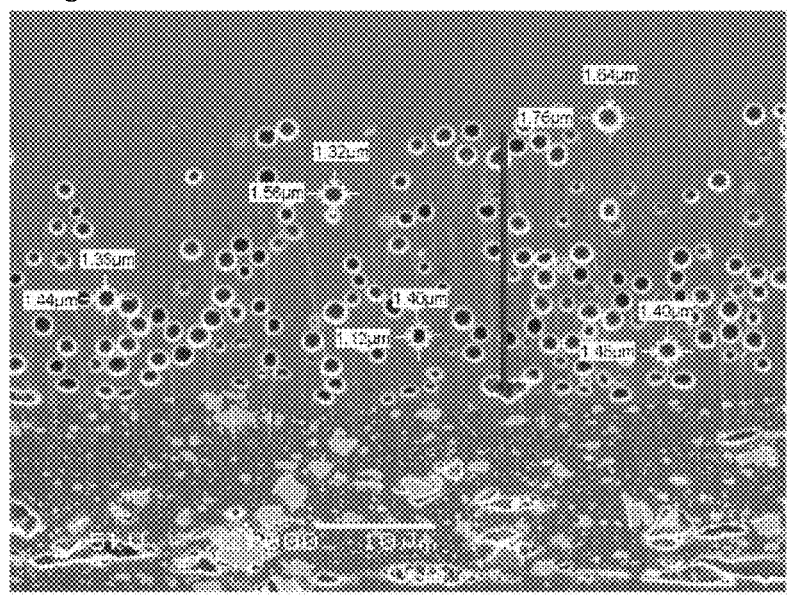
[Figure 4]
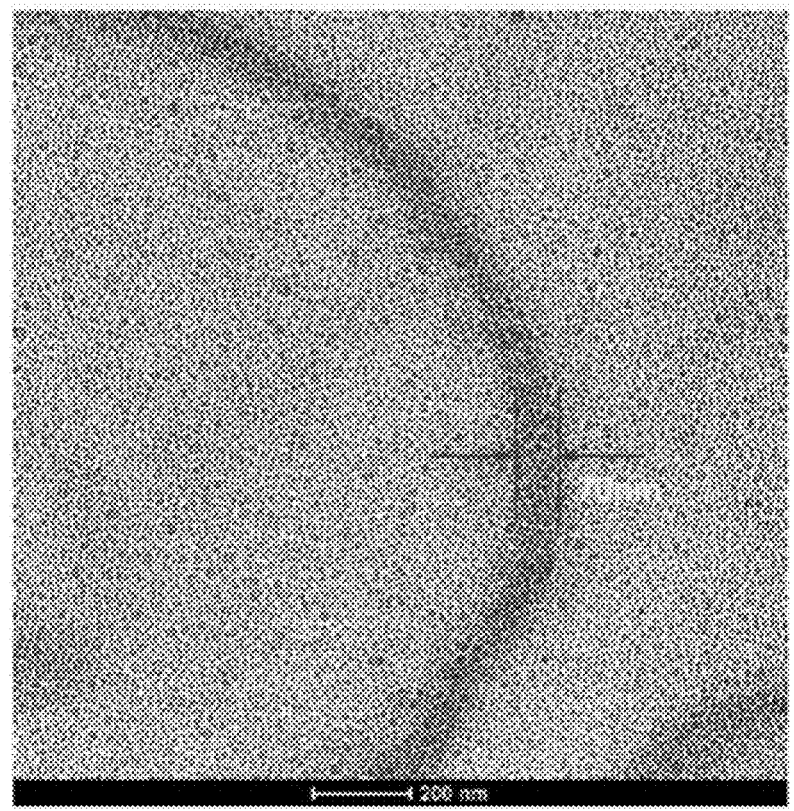

[Figure 5]
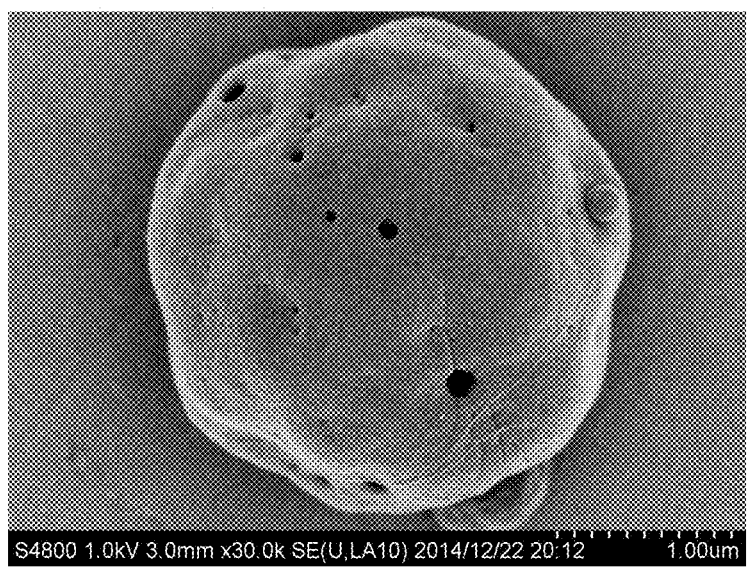

HEAT-SENSITIVE RECORDING MATERIAL HAVING INTERMEDIATE LAYER THAT CONTAINS HOLLOW PARTICLES

TECHNICAL FIELD

The present invention relates to a heat-sensitive recording body. In more detail, the present invention relates to an improvement of an intermediate layer ("undercoat layer") arranged between a support and a heat-sensitive color forming layer each constituting the heat-sensitive recording body and relates to a technique by which providing a heat-sensitive recording body (or heat-sensitive recording paper) that is excellent in high-speed recording properties, that can produce a high-quality image with a high sensitivity, and that is excellent in printability can be realized by the improvement.

BACKGROUND ART

In recent years, improvements of performance, such as energy saving, enhancement of printing speed, and high densification of print density, have been required for heat-sensitive recording using a thermal head, and producing a high-quality image with a high sensitivity even at a low thermal energy have been required for a heat-sensitive recording body for use in the heat-sensitive printing.

On the other hand, the applications of the heat-sensitive recording body are widespread, and recently, the heat-sensitive recording body has been used in a wide range of applications, such as labels, tickets, and receipts, including applications of early stages, such as facsimiles, terminal printers for computers, and recorders for measurement. As the range of use applications expands, high-speed recording performance, namely, high-quality image recording with a high sensitivity has been required for physical distribution labels, food labels, handy terminals for meter reading, tickets, and the like. For example, making it possible to perform good recording in which occurrence of blur is reduced, and difference in density between a printed portion and a non-printed portion is clear at a high speed is required for the heat-sensitive recording body. Further, information that is already known is generally printed in advance on the heat-sensitive recording face with offset printing, and in this case, offset printability is required for the surface of the heat-sensitive recording paper.

Conventionally used methods for enhancing the sensitivity of a heat-sensitive recording body are broadly classified as follows.
(1) Enhancement by using a chemical or chemicals such as a leuco dye, a developer, and a sensitizer (collectively referred to as color formers).
(2) Enhancement by devising a layer configuration of the heat-sensitive recording body.

The present invention relates to (2) the layer configuration of the heat-sensitive recording body and relates to an improvement of an intermediate layer to be provided between a support and a heat-sensitive color forming layer.

The rolls of the heat-sensitive recording body in the enhancement of sensitivity brought about by providing the intermediate layer are as follows.
(1) Smoothness of the surface of the heat-sensitive recording body is maintained to increase the contact area with a thermal recording head (thermal head), thereby improving the heat transmission to the heat-sensitive color forming layer.
(2) The heat-sensitive recording body exhibits an effect that the heat transmitted to the heat-sensitive color forming layer is retained in the heat-sensitive color forming layer, so that the heat is not dissipated on the base paper side to utilize the heat effectively for color-forming reaction, a so-called heat insulating effect.

For example, Patent Literature 1 describes that the sensitivity is enhanced by providing an intermediate layer mainly comprising a hollow particle between a support and a heat-sensitive color forming layer. Besides, it is known that a bulky inorganic pigment such as silica or calcined clay having an oil absorption of 80 ml/100 g or more (JIS-K5101) is used as a material for forming an intermediate layer, but the effect of enhancing the sensitivity is inferior to that obtained by the intermediate layer formed using a hollow particle. As the hollow particle, an inorganic substance and an organic substance are known. However, a hollow particle made of the inorganic substance has a large particle diameter and therefore cannot be put into practical use for an intermediate layer of heat-sensitive recording paper.

The hollow particle made of the organic substance is classified into two as described below, and it is known that both a foamed hollow particle and a non-foamed hollow particle can be put into practical use for an intermediate layer of heat-sensitive recording paper.
(1) A foamed hollow particle (also referred to as thermally expandable hollow particle) obtained by encapsulating a volatile substance such as isobutane with a thermoplastic polymer containing vinylidene chloride and then expanding the resultant encapsulated isobutane by heating to make a hollow body, the foamed hollow particle described in Patent Literature 2 or Patent Literature 3.
(2) A non-foamed hollow particle produced by an alkali swelling method, the non-foamed hollow particle described in Patent Literature 4 or 5.

CITATION LIST

Patent Literature

Patent Literature 1: Japanese Patent Application Laid-Open No. 59-005093
Patent Literature 2: Japanese Patent Application Laid-Open No. 3-67735
Patent Literature 3: Japanese Patent Application Laid-Open No. 4-241987
Patent Literature 4: Japanese Patent Application Laid-Open No. 56-32513
Patent Literature 5: Japanese Patent Application Laid-Open No. 63-213509

SUMMARY OF INVENTION

Technical Problem

However, with respect to the foamed hollow particle, the percentage of hollowness can be made large, and the heat insulating effect is excellent, but the particle diameter is difficult to control to make the particle size distribution extremely broad because the foamed hollow particle is produced by foaming a volatile substance contained, and therefore the means of classification needs to be used in producing the foamed hollow particle to make the foamed hollow particle extremely unproductive. Moreover, even if the classification is performed, the resultant particle diameters are not uniform, and therefore the formed intermediate layer becomes thick to bring about lowering of image quality. Naturally, various proposals for solving these problems have been made, but a satisfactory solution has not been found yet.

Furthermore, the particle diameter is large, but the shell is thin, and therefore there is also a problem that the mechanical strength of a shell is extremely low to make it difficult to maintain the printability (particularly, surface print strength). That is, peeling is liable to occur from the intermediate layer portion the strength of which is low due to tackiness of an ink on a blanket during performing offset printing, so that the foamed hollow particle is not suitable particularly for high-speed printing in which the surface print strength is required. This problem can be solved to a certain extent when a binder in the intermediate layer is used in large amount. However, conversely in this case, the heat insulation property of the intermediate layer is lowered, so that another problem that lowering of sensitivity is brought about arises.

In contrast, the non-foamed hollow particle has the advantage that the particle size distribution is sharp from the characteristics of the production method, and therefore a step of classification is unnecessary to make the production cost extremely lower than that for the foamed hollow particle. Furthermore, the non-foamed hollow particle has performance that the mechanical strength of the shell is higher than that of the foamed hollow particle, which is suitable for high-speed printing. However, it is difficult to increase the percentage of hollowness while keeping a state of a good spherical particle when it comes to a large particle, for example, having a particle diameter of 1.5 μm or larger and there has been a problem that the heat insulation effect of the intermediate layer in the case where the non-foamed hollow particle is used is lower than that in the case where the foamed hollow particle is used. According to the studies conducted by the present inventors, it has been found that when the particle diameter of the non-foamed hollow particle is made large, as large as 1.5 μm or larger, and the percentage of hollowness is forcedly increased to use the non-foamed hollow particle for forming an intermediate layer, the particle which keeps a spherical shape and which has a uniform particle diameter cannot be made. Accordingly, the development of a hollow particle which keeps the state of a spherical particle favorably, which has a uniform particle diameter, which has a particle diameter of 1.5 μm or larger, and which has a high percentage of hollowness is desirable in the case where the hollow particle is applied to the intermediate layer that constitutes a heat-sensitive recording body.

In consideration of the above-described circumstances, the present inventors have considered that the non-foamed hollow particle is comprehensively suitable as a hollow particle for application to an intermediate layer that constitutes a heat-sensitive recording body. That is, even though the percentage of hollowness of the non-foamed hollow particle is more difficult to increase than that of the foamed hollow particle, and the non-foamed hollow particle is inferior to the foamed hollow particle in the performance of giving heat insulating effect, the non-foamed hollow particle has advantages that reduction of production cost is possible, and besides, the thickness of the intermediate layer is made thinner in the case where the non-foamed hollow particle is used than in the case where the foamed hollow particle is used, and the non-foamed hollow particle can be made to have an important performance of high-speed printability when compared to the foamed hollow particle.

Accordingly, an object of the present invention is to provide a heat-sensitive recording body that has achieved so-called two kinds of performance which are mutually exclusive in that the heat-sensitive recording body can follow the enhancement of high-speed recording in heat-sensitive recording in recent years and makes it possible to perform high-quality image recording with a high sensitivity, and besides, the heat-sensitive recording body has offset printability in printing known information on a heat-sensitive recording face by improving the non-foamed hollow particle that constitutes the intermediate layer of the heat-sensitive recording body to make a suitable non-foamed hollow particle that keeps the state of a spherical particle in the intermediate layer favorably, that has a uniform particle diameter, that has a particle diameter of 1.5 μm or larger, and that has a high percentage of hollowness.

Solution to Problem

The object of the present invention can be achieved by the present invention described below. That is, the present invention provides [1] a heat-sensitive recording body comprising: a support; an intermediate layer; and a heat-sensitive color forming layer comprising as main components a leuco dye and a developer, the intermediate layer and the heat-sensitive color forming layer stacked on the support in the order as mentioned, wherein the intermediate layer comprises a hollow particle comprising: a hollow core portion formed by drying a solvent for an alkali-swellable aqueous gel comprising a (meth)acrylic-based copolymer having an acid value of 200 to 400 mgKOH/g; and a resin portion encapsulating the core portion and having a non-alkali-swellable outermost layer of the particle, the non-alkali-swellable outermost layer formed using a hydrophobic monomer, and the hollow particle has an average particle diameter of 1.5 to 3.5 μm and a percentage of hollowness of 60 to 85%.

Preferred embodiments of the heat-sensitive recording body according to the present invention include the following embodiments.

[2] The heat-sensitive recording body according to [1], wherein the intermediate layer is formed by preparing as a coating liquid a mixture comprising: an aqueous gel-encapsulating resin particle emulsion wherein the aqueous gel that is to be the hollow core portion after drying and that encapsulates the solvent is encapsulated by the resin portion; and an aqueous emulsion of a hydrophobic polymer being a binder resin, and applying the coating liquid on the support to thereafter dry the solvent.

[3] The heat-sensitive recording body according to [2], wherein the hydrophobic polymer is at least one selected from the group consisting of styrene-acrylic copolymers, styrene-butadiene copolymers, styrene-butadiene-acrylic copolymers, acrylonitrile-butadiene copolymers, ethylene-vinyl acetate copolymers, vinyl chloride-vinyl acetate copolymers, vinyl acetate-acrylic copolymers, acrylic copolymers, vinyl acetate resins, and polyurethane resins.

[4] The heat-sensitive recording body according to [1], wherein the intermediate layer is formed by preparing as a coating liquid a mixture comprising: an aqueous gel-encapsulating resin particle emulsion wherein the aqueous gel that is to be the hollow core portion after drying and that encapsulates the solvent is encapsulated by the resin portion and the outermost layer of the resin portion is formed with a resin having a crosslinked structure; and an aqueous emulsion of a water-soluble polymer being a binder resin, and applying the coating liquid on the support to thereafter dry the solvent.

[5] The heat-sensitive recording body according to [4], wherein the water-soluble polymer is at least one selected from the group consisting of polyvinyl alcohol and derivatives thereof, starch and derivatives thereof, hydroxymethyl cellulose, hydroxyethyl cellulose, hydroxypropyl cellulose, methyl cellulose, ethyl cellulose, sodium polyacrylate, polyvinylpyrrolidone, acrylamide-acrylic acid ester copolymers, acrylamide-acrylic acid ester-methacrylic acid ester copolymers, styrene-maleic anhydride copolymers, isobutylene-maleic anhydride copolymers, and casein and gelatin and derivatives thereof.

[6] The heat-sensitive recording body according to any one of [1] to [5], wherein the intermediate layer has a thickness of 2 to 20 g/m$^2$.

[7] The heat-sensitive recording body according to any one of [1] to [6], further comprising a protective layer comprising as main components a water-soluble polymer and/or an aqueous emulsion of a hydrophobic polymer, the protective layer stacked on the heat-sensitive color forming layer.

[8] The heat-sensitive recording body according to any one of [1] to [7], further comprising an undercoat layer mainly comprising an inorganic pigment, the undercoat layer provided between the support and the intermediate layer.

Advantageous Effects of Invention

According to the present invention, even though the particle diameter of the non-foamed hollow particle in an intermediate layer that constitutes a heat-sensitive recording body is large, as large as 1.5 µm or larger, the non-foamed hollow particle can be made such that the non-foamed hollow particle has a uniform particle diameter, the state of the spherical particle is kept favorable, the percentage of hollowness is made high, as high as 60 to 85%, and the thickness of the intermediate layer is made thinner than in the case where the foamed hollow particle is used, and as a result, a heat-sensitive recording body that has achieved so-called two kinds of performance which are mutually exclusive can be provided in that the heat-sensitive recording body can follow the enhancement of high-speed recording in heat-sensitive recording in recent years and makes it possible to perform high-quality image recording with a high-sensitivity, and besides, the heat-sensitive recording body has offset printability in printing known information on a heat-sensitive recording face.

BRIEF DESCRIPTION OF DRAWINGS

FIG. 1 is an SEM image at 400 magnifications showing a cross section of heat-sensitive recording paper of Example 1.

FIG. 2 is an SEM image at 2000 magnifications obtained by enlarging a portion of the intermediate layer in FIG. 1.

FIG. 3 is an SEM image showing particle diameters of hollow particles contained in the intermediate layer in FIG. 2.

FIG. 4 is a TEM image at 7000 magnifications of a particle constituting an aqueous gel-encapsulating resin particle emulsion used for forming an intermediate layer in Example 1.

FIG. 5 is an FE-SEM image at 30,000 magnifications of a particle constituting an aqueous gel-encapsulating resin particle emulsion used for forming an intermediate layer in Example 1.

DESCRIPTION OF EMBODIMENTS

Next, the present invention will be described in more detail giving preferred embodiments for carrying out the present invention. It is to be noted that the term "(meth) acrylic" means both "acrylic" and "methacrylic", and the term "(meth)acrylate" means both "acrylate" and "methacrylate".

The average particle diameter as specified in the present invention refers to a value measured by a laser diffraction-scattering method under the following conditions. Specifically, the average particle diameter refers to a median diameter measured with a particle size distribution measuring machine, a measurement module MT 3300 EXII, and a sample circulating device SDC 200 ml each manufactured by MicrotracBEL Corp. under the conditions of measurement conditions: default settings, solvent: water (refractive index=1.31), particle shape: non-spherical shape (refractive index=1.81), number of times of measurement: Avg/2, measuring time: 10 seconds, and measuring range: 0.021 to 2000 µm.

The present inventors have conducted diligent studies to make the best use of the characteristics of the non-foamed hollow particle (hereinafter, simply referred to as hollow particle) in the case where the non-foamed hollow particle is applied to an intermediate layer of a heat-sensitive recording body to obtain hollow particles having various particle diameters and percentages of hollowness and form intermediate layers using these hollow particles for conducting various studies. As a result, the present inventors have achieved to obtain a heat-sensitive recording body which makes it possible to perform high-quality image recording with a high sensitivity and which has high-speed offset printability and have reached the present invention.

The percentage of hollowness as specified in the present invention refers to a value determined in the manner as described below. First of all, an average maximum particle diameter of 10 hollow particles is determined from surface observation (SEM) through electron micrograph observation, and further, the thickness of a resin portion (shell) is determined from transmissive observation (TEM). Subsequently, the percentage of hollowness is obtained from these values using the following calculation formula assuming that the particle has a spherical shape.

Percentage of hollowness (%)={(average maximum particle diameter measured with SEM–thickness of shell resin portion determined with TEM×2)$^3$/(average maximum particle diameter measured with SEM)$^3$}×100

The heat-sensitive recording body according to the present invention is a heat-sensitive recording body comprising: a support; an intermediate layer; and a heat-sensitive color forming layer comprising as main components a leuco dye and a color developer, the intermediate layer and the heat-sensitive color forming layer stacked on the support in the order as mentioned. The intermediate layer is characterized in that the intermediate layer comprises a hollow particle and the hollow particle has the following constitution. That is, the hollow particle comprises: a hollow core portion formed by drying a solvent for an alkali-swellable aqueous gel comprising a (meth)acrylic-based copolymer having an acid value of 200 to 400 mgKOH/g; and a resin portion encapsulating the core portion and having a non-alkali-swellable outermost layer of the particle, the non-alkali-swellable outermost layer formed using a hydrophobic monomer, and the hollow particle has an average particle diameter of 1.5 to 3.5 µm and a percentage of hollowness of 60 to 85%. Hereinafter, each constituent element will be described.

<Support>

The support that constitutes the heat-sensitive recording body according to the present invention is generally paper comprising wood pulp as the main component, such as wood free paper and recycled paper. Needless to say, a synthetic resin film and the like can also be used.

<Heat-Sensitive Color Forming Layer>

As a heat-sensitive color forming component in the heat-sensitive color forming layer that constitutes the heat-sensitive recording body according to the present invention, a heat-sensitive color forming component comprising as the main components a leuco dye and an electron-accepting substance (also referred to as color developer) is applied. Representative examples of the heat-sensitive color forming component of the conventionally known color forming systems include a color forming component making use of reaction of a leuco dye with a color developer, a color forming component making use of reaction of an imino compound with an isocyanate compound, and a color forming component making use of reaction of an iron salt of a long-chain fatty acid with a polyhydric phenol, and in the present invention, the color forming component making use of reaction of a leuco dye with an electron-accepting substance, which is particularly suitable, is used.

The heat-sensitive color forming layer that constitutes the present invention and that consists of a coating layer comprising as the main components a leuco dye and a color developer for allowing the leuco dye to form color upon contact with the leuco dye can be formed in the manner as described below. That is, the heat-sensitive color forming layer that constitutes the present invention can be formed in such a way that a paint obtained by mixing a publicly known additive or additives, such as, for example, a pigment, a surfactant, and a thermoplastic substance (lubricant), with a leuco compound, a color developer, and a binding agent (binder), which are essential components, is prepared, and then the obtained paint is applied.

Examples of the leuco compound (dye) for use in the present invention include the following compounds, and those can be used singly or as a mixture of two or more types thereof. Examples thereof include triphenylmethane-based, fluoran-based, phenothiazine-based, auramine-based, spiropyran-based, and indolino-phthalide-based compounds. More specifically, examples thereof include 3,3-bis(p-dimethylaminophenyl)-phthalide, 3,3-bis(p-dimethylaminophenyl)-6-dimethylaminophthalide, 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-clorofluoran, 3-dimethylamino-5,7-dimethylfluoran, 3-N-methyl-N-isobutyl-6-methyl-7-anilinofluoran, 3-N-ethyl-N-isoamyl-6-methyl-7-anilinofluoran, 3-diethylamino-7-clorofluoran, 3-diethylamino-7-methylfluoran, 3-diethylamino-7,8-benzfluoran, 3-diethylamino-6-methyl-7-cholofluoran, 3-(N-ethyl-N-p-tolyl)-6-methyl-7-anilinofluoran, 3-(N-p-tolyl-N-ethylamino)-6-methyl-7-anilinofluoran, 3-pyrrolidino-6-methyl-7-anilinofluoran, 2-{N-(3'-trifluoromethylphenyl)amino}-6-diethylaminofluoran, 2-{3,6-bis(diethylamino)-9-(o-chloroanilino)xanthyl benzoic acid lactam}, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-diethylamino-6-methyl-7-(2',4'-dimethylanilino)fluoran, 3-(N,N-diethylamino)-5-methyl-7-(N,N-dibenzylamino)fluoran, benzoyl leuco methylene blue, 6'-chloro-8'-methoxy-benzindolino-pyrrilospiran, 6'-bromo-3'-methoxy-benzoindlino-pyrrilospiran, 3-(2'-hydroxy-4'-dimethylaminophenyl)-3-(2'-methoxy-5'-chlorophen yl)phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyl-toluidino)-7-(p-n-butylanilino)fluoran, 3-(N-methyl-N-isopropylamino)-6-methyl-7-anilinofluoran, 3-dibutylamino-6-methyl-7-anilinofluoran, 3,6-bis(dimethylamino)fluorene spiro(9,3')-6'-dimethylaminophthalide, 3-(N-benzyl-N-cyclohexylamino)-5,6-benzo-7-α-naphthylamino-4'-bromo-fluoran, 3-diethylamino-6-chloro-7-anilinofluoran, 3-N-ethyl-N-(2-ethoxypropyl)amino-6-methyl-7-anilinofluoran, 3-N-ethyl-N-tetrahydrofurfurylamino-6-methyl-7-anilinofluoran, and 3-diethylamino-6-methyl-7-mesitydino-4',5'-benzofluoran.

The electron-accepting developer for use in the present invention, which allows the leuco dye as described above to form color upon contact with the leuco dye, is not particularly limited, and compounds described below can be used. For example, phenolic compounds, thiophenolic compounds, thiourea derivatives, organic acids and metal salts thereof, and the like can be used. More specific examples thereof include: phenolic compounds such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-cyclohexylidenediphenol, 1,1-bis(4-hydroxyphenyl)-1-phenyletane, 4,4'-dihydroxydiphenyl sulfide, 4,4'-thiobis(3-methyl-6-tert-butylphenol), 4,4'-dihydroxydiphenyl sulfone, 2,4'-dihydroxydiphenyl sulfone, 4-hydroxy-4'-isopropoxydiphenyl sulfone, bis(3-allyl-4-hydroxyphenyl) sulfone, butyl bis(p-hydroxyphenyl)acetate, and methyl bis(p-hydroxyphenyl)acetate; hydroxy group-containing phenolic compounds such as 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, tolyl 4-hydroxybenzoate, chlorophenyl 4-hydroxybenzoate, and 4,4'-dihydroxydiphenyl ether; aromatic carboxylic acids such as benzoic acid, p-tert-butylbezoic acid, trichlorobenzoic acid, terephthalic acid, salicylic acid, 3-tert-butylsalicylic acid, 3-isopropylsalicylic acid, 3-benzylsalicylic acid, 3-(α-methylbenzyl) salicylic acid, and 3,5-di-tert-butylsalicylic acid; organic acidic substances such as salts of any of these phenolic compounds or any of aromatic carboxylic acids and a multivalent metal such as, for example, zinc, magnesium, aluminum, or calcium; and urea compounds such as N-p-toluenesulfonyl-N'-3-(p-toluenesulfonyloxy)phenylurea, N-(p-toluenesulfonyl)-N'-(p-butoxycarboyl)urea, and N-p-tolylsulfonyl-N'-phenylurea.

The developer is preferably used in an amount of usually 100 to 700 parts by mass, more preferably 150 to 400 parts by mass based on 100 parts by mass of the leuco dye in total. Needless to say, two or more types of developers can also be used together as necessary.

In the present invention, an image stabilizer may further be used as a material for forming a heat-sensitive color forming layer that constitutes the heat-sensitive recording body according to the present invention for the purpose of mainly improving preservability of a recorded color image. As the image stabilizer, an image stabilizer comprising at least one selected from, for example, phenol-based compounds such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyl)butane, 4,4'-[1,4-phenylenebis(1-methylethylidene)]bisphenol, 4,4'-[1,3-phenylenebis(1-methylethylidene)]bisphenol, and 2,2'-[4-(4-hydroxyphenylsulfonyl)phenoxy]diethyl ether; sulfone compounds such as 4-benzyloxyphenyl-4'-(2-methyl-2,3-epoxypropyloxy)phenyl sulfone, 4-(2-methyl-1,2-epoxyethyl)diphenyl sulfone, 4,4'-bis[(4-methyl-3-phenoxycarbonylaminophenyl)ureide]diphenyl sulfone, and 4-(2-ethyl-1,2-epoxyethyl)diphenyl sulfone; and isocyanuric acid compounds such as 1,3,5-tris(2,6-dimethylbenzyl-3-hydrocy-4-tert-butyl) isocyanurate can be used. Needless to say, the image stabilizer is not limited to these compounds, and moreover, two or more types of these compounds can be used together as necessary.

A thermoplastic resin can be contained as a sensitizer in the material for forming a heat-sensitive color forming layer for the purpose of adjusting the color-forming sensitivity of the heat-sensitive color forming layer. As the sensitizer, compounds which have been conventionally known as a sensitizer for a heat-sensitive recording body can be used. Specific examples thereof include para-benzylbiphenyl, dibenzylterephthalate, phenyl 1-hydroxy-2-naphthoate, dibenzyl oxalate, di-o-chlorobenzyl adipate, 1,2-di(3-methylphenoxy)ethane, di-p-methylbenzyl oxalate, di-p-chlorobenzyl oxalate, 1,2-bis(3,4-dimethylphenyl)ethane, and 1,3-bis(2-naphthoxy)diphenyl sulfone.

The developer for use in the present invention and additives to be used as necessary, such as the image stabilizer and the sensitizer, may be dispersed in water in the same manner as in the case where the leuco dye is used in a solid particulate state to be mixed with the paint for forming the heat-sensitive color forming layer when it is prepared. In addition, these additives can also be used by dissolving these additives in a solvent and then emulsifying the dissolved additives in water with a water-soluble polymer compound as an emulsifying agent.

In the present invention, a particulate extender pigment (extender) having an average particle diameter of 10 µm or smaller can be contained in the heat-sensitive color forming layer for the purpose of giving drivability (prevention of sticking and scum adhesion) as heat-sensitive recording paper. For example, inorganic pigments such as calcium carbonate, magnesium carbonate, kaolin, clay, talc, calcined clay, silica, diatomaceous earth, synthetic aluminum silicate, zinc oxide, titanium oxide, aluminum hydroxide, barium sulfate, and surface-treated calcium carbonate and silica, and organic pigments such as urea-formalin resins, styrene-methacrylic acid copolymer resins, and polystyrene resins. Particularly, to prevent the scum adhesion to a thermal head and the sticking, the inorganic pigment having an oil absorption of 50 ml/100 g or more is preferably used. The amount of the inorganic pigment to be blended is preferably an amount to such an extent that does not lower the color density, that is the amount of the inorganic pigment to be blended is preferably 50% by mass or less based on the mass of the total solid content in the heat-sensitive color forming layer.

As an additional component material for forming a heat-sensitive color forming layer that constitutes the heat-sensitive recording body according to the present invention, a binder is used, and further, a crosslinking agent, a wax, metal soap, a colored dye, a colored pigment, a fluorescent dye, and the like can be used as necessary. Examples of the binder include water-soluble polymer materials such as polyvinyl alcohol and derivatives thereof, starch and derivatives thereof, cellulose derivatives such as hydroxymethyl cellulose, hydroxyethyl cellulose, hydroxypropyl cellulose, methyl cellulose, and ethyl cellulose, sodium polyacrylate, polyvinylpyrrolidone, acrylamide-acrylic acid ester copolymers, acrylamide-acrylic acid ester-methacrylic acid ester copolymers, styrene-maleic anhydride copolymers, isobutylene-maleic anhydride copolymers, casein and gelatin and derivatives thereof, and aqueous emulsions of hydrophobic polymers such as styrene-acrylic copolymers, styrene-butadiene copolymers, styrene-butadiene-acrylic copolymers, acrylonitrile-butadiene copolymers, ethylene-vinyl acetate copolymers, vinyl chloride-vinyl acetate copolymers, vinyl acetate-acrylic copolymers, acrylic copolymers, vinyl acetate resins, and polyurethane resins.

Moreover, a crosslinking agent for three-dimensionally curing the binder can be contained in the heat-sensitive color forming layer for the purpose of improving water resistance of the heat-sensitive color forming layer. For example, at least one crosslinking compound selected from aldehyde-based compounds such as glyoxal, polyamine-based compounds such as polyethyleneimine, epoxy-based compounds, polyamide resins, melamine resins, dimethylol urea compounds, aziridine compounds, blocked isocyanate compounds, inorganic compounds such ammonium peroxodisulfate, ferric chloride, magnesium chloride, sodium tetraborate, and potassium tetraborate, boric acid, boric acid triesters, boron-based polymers, and the like is preferably used in a range from 1 to 10% by mass based on the mass of the total solid content in the material for forming a heat-sensitive color forming layer.

Furthermore, a wax can be added to the material for forming a heat-sensitive color forming layer, and examples thereof include waxes such as a paraffin wax, a carnauba wax, microcrystalline waxes, polyolefin waxes, and polyethylene waxes, higher fatty acid amides such as stearic acid amide and ethylene-bis-stearic acid amide, and higher fatty acid esters and derivatives thereof.

Examples of the metal soap that can be added to the material for forming a heat-sensitive color forming layer include polyvalent metal salts of a higher fatty acid such as zinc stearate, aluminum stearate, calcium stearate, and zinc oleate. In addition, various additives such as an oil repellant, a defoamer, and a viscosity modifier can be added in the heat-sensitive color forming layer in a range that does not impair the effects of the present invention The types and amounts of the leuco dye and the developer for use as a material for forming a heat-sensitive color forming layer and the types and amounts of the other various components to be used as necessary are appropriately adjusted according to the purpose. Usually, 100 to 700 parts by mass of the developer, 25 to 500 parts by mass of the sensitizer, and 10 to 500 parts by mass of the particulate inorganic pigment are used based on 100 parts by mass of the leuco dye, and the binder is used in an amount of about 10 to about 25% by mass of the total solid content.

<Protective Layer>

In the heat-sensitive recording body according to the present invention, a protective layer can be provided on the heat-sensitive color forming layer described above. The protective layer is constituted mainly with a particulate inorganic pigment and a binder, which is similar to protective layers which have been used conventionally for publicly known heat-sensitive recording materials. In the heat-sensitive recording body according to the present invention, particularly in the protective layer, a lubricant such as a polyethylene wax or zinc stearate is preferably added for the purpose of preventing sticking to a thermal head, and an ultraviolet absorber can also be contained. Further, two or more protective layers can be provided. Moreover, by providing a glossy protective layer, the added value of a product can be enhanced.

<Intermediate Layer>

The heat-sensitive recording body according to the present invention is characterized in that the intermediate layer comprises a particular hollow particle described below. The particular hollow particle that characterizes the present invention has an average particle diameter of 1.5 µm or larger and 3.5 µm or smaller, and even though the percentage of hollowness is extremely high, as high as 60 to 85%, the particular hollow particle can maintain the high percentage of hollowness and can exist in a state of a spherical particle having a uniform particle diameter without being crushed in the intermediate layer when the intermediate layer is formed using the particular hollow particle, as shown in FIG. 2 and FIG. 3. Therefore, a high heat insulating effect is obtained due to the formed intermediate layer, and the intermediate layer can be made thinner than in the case where the foamed hollow particle is used and can improve the heat transmission to the heat-sensitive color forming layer by increasing the contact area with a thermal recording head (thermal head). Furthermore, the particular hollow particle has a sufficient mechanical strength and an excellent offset printability on the surface of the heat-sensitive recording paper when compared to the case where the foamed hollow particle, which has a larger particle diameter but has a thinner shell, is used.

The above-described intermediate layer excellent in functionality can be formed easily by the methods described below. For example, the intermediate layer can be formed easily by preparing as a coating liquid a mixture comprising: an aqueous gel-encapsulating resin particle emulsion in which an aqueous gel which encapsulates a solvent and in which the hollow core portion as shown in FIG. 2 and FIG. 3 is formed by drying the solvent is encapsulated by a resin portion (shell) having a non-alkali-swellable outermost layer of the particle, the non-alkali-swellable outermost layer formed using a hydrophobic monomer; and an aqueous emulsion of a hydrophobic polymer being a binder resin, and applying the coating liquid on the above-described support and then drying the solvent.

In addition, another embodiment for forming the intermediate layer includes using a water-soluble polymer as the binder resin. However, in that case, the aqueous gel-encapsulating resin particle emulsion in which at least the outermost layer of the resin portion that constitutes the aqueous gel-encapsulating resin particle emulsion which is used together with the water-soluble polymer is formed with a resin having a crosslinked structure is preferably used. The hollow particle for use in the present invention has a high percentage of hollowness, as high as 60 to 85%, and therefore when the water-soluble polymer is used as the binder resin for forming the intermediate layer, there is a risk that the hollow particle is crushed into a bowl-like shape in forming hollows by drying the solvent. Therefore, in the case where the water-soluble resin is used as the main component of the binder resin, an aqueous gel-encapsulating resin particle emulsion in which a crosslinked structure is introduced in the resin portion that constitutes the aqueous gel-encapsulating resin particle emulsion to enhance the strength of the hollow particle is preferably used.

The aqueous gel-encapsulating resin particle emulsion used above can be produced, for example, in the manner as described below. A seed particle having a core-shell structure comprising an alkali-swellable core portion and a shell layer having a non-alkali-swellable outermost layer formed using a hydrophobic monomer is used, and further, a resin layer to be the outermost layer of the particle is stacked on the shell layer using a hydrophobic monomer to form a resin portion having a non-alkali-swellable outermost layer of the particle, the non-alkali-swellable outermost layer formed using a hydrophobic monomer, thereby making it possible to produce the aqueous gel-encapsulating resin particle emulsion for use in the coating liquid for forming an intermediate layer.

When the aqueous gel-encapsulating resin particle emulsion is produced, it is preferable to use as the seed particle a particle which has an alkali swelling ratio of 200% or more, more preferably 400% or more and which has a core-shell structure in which a particle form is maintained while having a high alkali swelling ratio, the particle obtained by subjecting a core-shell particle in which the alkali-swellable core particle made of a (meth)acrylic-based copolymer having an acid value of 200 to 400 mgKOH/g is covered with a shell layer having a non-alkali-swellable outermost layer, the outermost layer formed using a hydrophobic monomer, to a swelling treatment with an alkali. The alkali swelling ratio can be determined by measuring the average particle diameter before and after the alkali swelling of the particle and using the measured values in the following expression.

Alkali swelling ratio (%)={(average particle diameter after alkali swelling)$^3$/(average particle diameter before alkali swelling)$^3$−1}×100

More specifically, the seed particle can be obtained in the manner as described below. First of all, a monomer mixture comprising an aliphatic alkyl (meth)acrylate (a1) having a C3 or less alkyl group, a carboxy group-containing monomer (a2), and a monomer which is copolymerizable with the (a1) and the (a2) and which has a total number of carbon atoms of 8 to 17 is copolymerized to obtain an alkali-swellable core particle made of a (meth)acrylic-based copolymer having an acid value of 200 to 400 mgKOH/g. Next, a material comprising the core particle and a hydrophobic monomer is subjected to emulsion polymerization to obtain a core-shell particle in which the core particle is covered with a shell layer having a non-alkali-swellable outermost layer formed using the hydrophobic monomer. The seed particle is obtained by subjecting the core-shell particle to a swelling treatment with an alkali.

Examples of the (a3) include styrene and a copolymerizable monomer represented by the following formula.

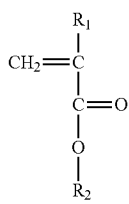

wherein $R_1$ in the formula represents a hydrogen atom or a methyl group, and $R_2$ represents a C4 to C13 alkyl group or a benzene ring- or alicyclic ring-containing C4 to C13 group.

Examples of the monomer represented by the formula include n-butyl (meth)acrylate, isobutyl (meth)acrylate, t-butyl (meth)acrylate, n-amyl (meth)acrylate, isoamyl (meth)acrylate, 2-ethylhexyl (meth)acrylate, n-octyl (meth) acrylate, isooctyl (meth)acrylate, isononyl (meth)acrylate, lauryl (meth)acrylate, tetrahydrofurfuryl (meth)acrylate, cyclohexyl (meth)acrylate, 3,3,5-trimethylcyclohexyl (meth)acrylate, cyclodecyl (meth)acrylate, cyclodecylmethyl (meth)acrylate, benzyl (meth)acrylate, phenyl (meth) acrylate, phenoxyethyl (meth)acrylate, and isobornyl (meth) acrylate. Among these monomers, cyclic monomers are preferable.

In addition, suitable examples of the (a1) include methyl (meth)acrylate, ethyl (meth)acrylate, n-propyl (meth)acrylate, and isopropyl (meth)acrylate.

Examples of the (a2) include acrylic acid, acrylic acid dimer, methacrylic acid, and monomers obtained by reacting maleic anhydride, succinic anhydride, or phthalic anhydride with a hydroxyalkyl (meth)acrylate such as 2-hydroxyethyl (meth)acrylate or 4-hydroxybutyl (meth)acrylate. Among them, it is preferable to use general-purpose acrylic acid or methacrylic acid. The amount of the carboxy group-containing monomer (a2) to be used is preferably blended such that the acid value of the copolymer to be obtained is about 200 to about 400 mgKOH/g, more preferably about 200 to about 300 mgKOH/g.

As the coating liquid for use in forming the intermediate layer that constitutes the heat-sensitive recording body according to the present invention, the coating liquids described below can be used. As one example, the aqueous gel-encapsulating resin particle emulsion obtained in the manner as described above and an aqueous emulsion of a hydrophobic polymer being a binder resin are mixed and used. As the aqueous emulsion of a hydrophobic polymer being a binder resin, for example, aqueous emulsions of styrene-acrylic copolymers, styrene-butadiene copolymers, styrene-butadiene-acrylic copolymers, acrylonitrile-butadiene copolymers, ethylene-vinyl acetate copolymers, vinyl chloride-vinyl acetate copolymers, vinyl acetate-acrylic copolymers, acrylic copolymers, vinyl acetate resins, and polyurethane resins can be used.

In the present invention, the types and amounts of the hydrophobic polymers are preferably selected so that the performance of the hollow particle described previously will not be impaired in the case where the intermediate layer is formed. According to studies conducted by the present inventors, by using the aqueous emulsion of any of the hydrophobic polymer as described above, a good intermediate layer can be formed. Specifically, it is preferable to prepare the coating liquid by appropriately using the aqueous emulsion of any of the hydrophobic polymers described above according to the performance of a desired intermediate layer (applied film) and the performance of the application machine to be used. According to studies conducted by the present inventors, although the water-soluble polymer can be used together, the particle may be deformed to deteriorate the performance depending on the types and added amounts of the water-soluble polymer to be used in forming the hollow core portion in a drying step after applying the coating liquid for forming an intermediate layer. Therefore, in the case where the water-soluble polymer is used together, the coating liquid is preferably prepared paying attention to this point without using the water-soluble polymer as the main component.

Specific examples of the aqueous emulsion of the hydrophobic polymer for use in preparing the coating liquid include aqueous emulsions of hydrophobic polymers such as styrene-acrylic copolymers, styrene-butadiene copolymers, styrene-butadiene-acrylic copolymers, acrylonitrile-butadiene copolymers, ethylene-vinyl acetate copolymers, vinyl chloride-vinyl acetate copolymers, vinyl acetate-acrylic copolymers, acrylic copolymers, vinyl acetate resins, and polyurethane resins. Among them, an aqueous emulsion of a styrene-butadiene copolymer is preferably used.

In the present invention, the water-soluble polymer can also be used as the main component of the binder resin that constitutes the coating liquid for use in forming the intermediate layer that constitutes the heat-sensitive recording body according to the present invention. However, in that case, an aqueous gel-encapsulating resin particle emulsion in which the resin portion that constitutes the aqueous gel-encapsulating resin particle emulsion to be used together with the water-soluble polymer is formed with a resin having a crosslinked structure is preferably used for the purpose of enhancing the strength of the hollow particle because the hollow particle for use in the present invention has a high percentage of hollowness, as high as 60 to 85%. According to studies conducted by the present inventors, by constituting the aqueous gel-encapsulating resin particle emulsion in this way, the particle will never be crushed into a bowl-like shape even though the hollow particle having an extremely high percentage of hollowness, as high as 60 to 85%, is used. That is, by constituting the aqueous gel-encapsulating resin particle emulsion in this way, the water-soluble polymer, which is excellent in versatility, can be used as the binder resin, and a wider range of utilization can be expected.

Examples of the water-soluble polymer to be used as the binder resin in preparing the coating liquid include the following water-soluble polymers. For example, water-soluble polymer materials such as polyvinyl alcohol and derivatives thereof, starch and derivatives thereof, cellulose derivatives such as hydroxymethyl cellulose, hydroxyethyl cellulose, hydroxypropyl cellulose, methyl cellulose, and ethyl cellulose, sodium polyacrylate, polyvinylpyrrolidone, acrylamide-acrylic acid ester copolymers, acrylamide-acrylic acid ester-methacrylic acid ester copolymers, styrene-maleic anhydride copolymers, isobutylene-maleic anhydride copolymers, and casein and gelatin and derivatives thereof can be used.

As described above, in the case where the water-soluble polymer is used as the binder resin, the aqueous gel-encapsulating resin particle emulsion in which the resin portion is formed with a resin having a crosslinked structure is preferably used as the aqueous gel-encapsulating resin particle emulsion to be used together with the water-soluble polymer. The emulsion having such constitution may be formed, for example, in the manner as described below. As described previously, the resin portion of the aqueous gel-encapsulating resin particle emulsion is formed by obtaining the seed particle having a core-shell structure comprising: an alkali-swellable core portion; and a shell layer having a non-alkali-swellable outermost layer formed using a hydrophobic monomer, and further, stacking a resin layer to be the outermost layer of the particle on the shell layer using a hydrophobic monomer material, and when the resin layer is stacked on the shell layer, the aqueous gel-encapsulating resin particle emulsion is obtained easily by using at least a monomer that is capable of forming a crosslinked structure as a material to be used for stacking a resin layer to be the outermost layer of the particle on the shell layer. Furthermore, a monomer that is capable of forming a crosslinked structure may be used as a material for forming the shell layer that constitutes the seed particle. By using such a monomer, the resin portion having a high strength can be formed.

Further, any of the inorganic pigments described above can be added in the coating liquid as necessary for the purpose of imparting coating applicability and smoothness, and in that case, the mixing ratio of the hollow particle and the inorganic pigment is preferably 9:1 to 1:9. Moreover, various additives such as a dispersant, a defoamer, a mold release agent, and a viscosity modifier can also be added.

<Protective Layer>

Further, a protective layer can be provided on the heat-sensitive recording body according to the present invention by stacking the protective layer on the heat-sensitive color forming layer using the above-described coating liquid comprising the water-soluble polymer and/or the aqueous emulsion of the hydrophobic polymer as the main components for the purpose of protecting the heat-sensitive color forming layer.

<Undercoat Layer>

Moreover, an undercoat layer can be provided between the support and the intermediate layer in the heat-sensitive recording body according to the present invention using, for example, a coating liquid mainly comprising the inorganic pigment having an oil absorption of 50 ml/100 g or more and any of the above-described publicly known binders for the purpose of enhancing the contact between the heat-sensitive color forming layer and a thermal head. The heat-sensitive recording body to be obtained can realize higher-quality image recording with a higher sensitivity by adopting such a configuration.

<Thickness of Each Layer that Constitutes Heat-Sensitive Recording Body>

As described above, the heat-sensitive recording body according to the present invention comprises: a support; an intermediate layer comprising a particular hollow particle; and a heat-sensitive color forming layer comprising as main components a leuco dye and a developer, the intermediate layer and the heat-sensitive color forming layer stacked on the support in the order as mentioned, and a protective layer and an undercoat layer can also be provided as necessary. In the case where the heat-sensitive recording body according to the present invention is heat-sensitive recording paper, the thickness of each layer that constitutes the heat-sensitive recording paper is preferably made as follows for example. First of all, it can be said that the protective layer to be provided as necessary is an inhibiting layer from the viewpoint of performing high-quality image recording with a high sensitivity, and therefore it is desirable that the thickness of the protective layer be as thin as possible. It is preferable that the thickness of the protective layer be about 2 μm to about 5 μm for the purpose of protecting the heat-sensitive color forming layer.

In addition, it is preferable that the higher the printing speed is, the thinner the heat-sensitive color forming layer that constitutes the present invention be made and the higher density of the color former be blended, and therefore it is preferable that the heat-sensitive color forming layer have a thickness of about 2 to about 6 μm when the protective layer is provided, or it is preferable that the heat-sensitive color forming layer have a thickness of about 3 to about 10 μm when the protective layer is not provided because an additive for imparting a head matching property is put into the heat-sensitive color forming layer.

For the intermediate layer that characterizes the present invention, it is required that the uppermost portion which is in contact with the heat-sensitive color forming layer have a higher heat insulating property. According to studies conducted by the present inventors, in the case where any of the conventional small hollow particles of about 1 μm is used in order to increase the heat insulating property of the uppermost portion, an effect of improving the heat insulating property is not sufficient enough even though the coating liquid is applied as thick as possible and the thickness of the intermediate layer is made as thick as possible. In contrast, according to the present invention, the effect of improving the heat insulating property is sufficiently exhibited at a thickness of about 2 to about 20 g/m$^2$, preferably about 2 to about 10 μm because the hollow particle having a large average particle diameter, as large as 1.5 to 3.5 μm, and having a high percentage of hollowness is used as described above. On the other hand, it is not preferable that the intermediate layer is made excessively thick because there is a risk that the excessive thickness may become a cause for lowering the strength of the printed surface.

Incidentally, in the case where a conventional foamed hollow particle is used for forming the intermediate layer, the particle diameter of the hollow particle to be used becomes large to make the intermediate layer thick, as thick as about 20 g/m$^2$ to about 40 g/m$^2$, and therefore there is a problem that the heat-sensitive recording body becomes liable to be peeled from a portion of the intermediate layer to deteriorate the strength of the printed surface remarkably.

An undercoat layer may be provided as necessary in the heat-sensitive recording body according to the present invention. The undercoat layer is preferably made to have a thickness of about 5 to about 20 μm because the undercoat layer is a layer for uniformly providing the intermediate layer by filling the unevenness of base paper being the support.

As a method for forming each layer described above on the support, any of the known application methods such as, for example, an air-knife method, a blade method, a gravure method, a roll coater method, a spray method, a dip method, a bar method, and an extrusion method may be used. In addition, a back layer can also be provided for the purpose of suppressing penetration of oil or a plasticizer from the back surface of the recording material or controlling curl. Furthermore, performing smoothing treatment on the heat-sensitive color forming layer using a known smoothing treatment method, such as super calender or a soft calender, gives an effect of enhancing the color formation sensitivity of the heat-sensitive color forming layer. The heat-sensitive color forming layer may be treated by pressing the surface thereof to any of a metal roll and an elastic roll of a calender.

EXAMPLES

The present invention will be described in more detail by the Examples described below, but the present invention is not limited to these Examples. It is to be noted that the "parts" and "%" represent "parts by mass" and "% by mass" respectively unless otherwise noted.

[Preparation of Coating Liquid for Forming 1st Heat-Sensitive Color Forming Layer]

<<Preparation of Heat-Sensitive Color Forming Components>>

(1) Preparation of Liquid A (Dispersion of Leuco Dye)

A composition consisting of 20 parts of 3-di(n-butyl) amino-6-methyl-7-anilinofluoran, 10 parts of an aqueous solution containing 5% of partially saponified PVA (trade name: GOHSELAN L-3266, manufactured by The Nippon Synthetic Chemical Industry Co., Ltd.), and 10 parts of water was pulverized with a sand mill until the average particle diameter reached 1.0 µm.

(2) Preparation of Liquid B (Dispersion of Developer)

A composition consisting of 20 parts of 4,4'-isopropylidenediphenol, 10 parts of an aqueous solution containing 5% of partially saponified PVA (trade name: GOHSELAN L-3266, manufactured by The Nippon Synthetic Chemical Industry Co., Ltd.), and 10 parts of water was pulverized with a sand mill until the average particle diameter reached 1.0 µm.

<<Preparation of Coating Liquid for Forming Heat-Sensitive Color Forming Layer>>

A composition consisting of 60 parts of a dispersion liquid containing 30% of silica (trade name: MIZUKASIL P-527, manufactured by MIZUSAWA INDUSTRIAL CHEMICALS, LTD.), 40 parts of the previously prepared liquid A, 120 parts of the previously prepared liquid B, 30 parts of an aqueous dispersion liquid of zinc stearate (trade name: Hidorin Z-7-30, solid content of 31.5%, manufactured by Chukyo Yushi Co., Ltd.) as a lubricant, and 150 parts of an aqueous solution containing 15% of completely saponified PVA (trade name: POVAL 105, molecular weight of 500, manufactured by KURARAY CO., LTD.) was mixed and stirred to obtain a coating liquid for forming the 1st heat-sensitive color forming layer.

[Preparation of Coating Liquid for Forming 2nd Heat-Sensitive Color Forming Layer]

A coating liquid for forming the 2nd heat-sensitive color forming layer was obtained entirely in the same manner as in the preparation of the coating liquid for forming the 1st heat-sensitive color forming layer except that 4,4'-dihydroxydiphenyl sulfone was used in place of 4,4'-isopropylidenediphenol used in Preparation of Liquid B (Dispersion of Developer) in preparing the coating liquid for forming the 1st heat-sensitive color forming layer.

[Preparation of Coating Liquid for Forming 3rd Heat-Sensitive Color Forming Layer]

A composition consisting of 40 parts of the liquid A, 120 parts of the liquid B, each of which was prepared in Preparation of Coating Liquid for Forming 1st Heat-Sensitive Color Forming Layer, 40 parts of styrene-butadiene polymer latex (solid concentration of 50%, glass transition point of 13° C.), 30 parts of an aqueous solution containing 15% of completely saponified PVA (trade name: POVAL 105, molecular weight of 500, manufactured by KURARAY CO., LTD.), and 120 parts of water was mixed and stirred to obtain a coating liquid for forming the 3rd heat-sensitive color forming layer.

[Preparation of Coating Liquid for Forming Protective Layer]

A coating liquid for forming a protective layer was obtained by mixing 60 parts of a dispersion liquid containing 30% of silica (trade name: MIZUKASIL P-527, manufactured by MIZUSAWA INDUSTRIAL CHEMICALS, LTD.), 30 parts of an aqueous dispersion liquid containing zinc stearate (trade name: Hidorin Z-7-30, solid content of 31.5%, manufactured by Chukyo Yushi Co., Ltd.), and 800 parts of an aqueous solution containing 10% of silicon-modified polyvinyl alcohol (trade name: R-1130, molecular weight of 1700, manufactured by KURARAY CO., LTD.).

[Preparation of Coating Liquid for Forming Intermediate Layer]

A coating liquid for forming the intermediate layer, consisting of a mixture comprising: an aqueous gel-encapsulating resin particle emulsion in which an aqueous gel that is to be a core portion after drying and that encapsulates a solvent is encapsulated by a non-alkali-swellable resin portion; and an aqueous emulsion of a hydrophobic polymer being a binder resin, was obtained in the manner as described below.

<<Preparation of Aqueous Gel-Encapsulating Resin Particle Emulsion>>

Aqueous gel-encapsulating resin particle emulsions for use in Examples and Comparative Examples were prepared making use of the alkali swelling method in the manner as described below (1) Preparation of Core Particle that Constitutes Seed Particle First of all, 45 parts of methyl methacrylate (MMA), 10 parts of cyclohexyl acrylate (CHA), and 45 parts of methacrylic acid (m-AAc) were stirred and mixed with 150 parts of water and 0.5 parts of a sodium polyoxyethylene polycyclic phenyl ether sulfate (number of moles of added EO chains of 4, number of carbon atoms in multi-ring phenyl group of 15) (hereinafter, refers to emulsifying agent A) to prepare an emulsified monomer mixture. A core particle emulsion was prepared using the resultant emulsified monomer mixture in the manner as described below.

In a 1 L four-necked round bottom flask equipped with a stirrer, a thermometer, and a reflux condenser, 247 parts of water were placed, and the temperature was raised to 80° C. while the air inside was replaced with nitrogen under stirring. Then, 0.1 parts of potassium persulfate were added as a polymerization initiator thereto and dissolved while keeping the internal temperature at 80° C., and after dissolving the potassium persulfate, 2% of the total amount of the emulsified monomer mixture prepared in advance was placed in the 1 L four-necked round bottom flask to perform polymerization for 30 minutes. Thereafter, the rest of the emulsified monomer mixture was dropped thereto over about 2 hours to perform reaction. After the completion of dropping of the emulsified monomer mixture, the reaction mixture was left to stand for about 2 hours, and thereafter filtration was conducted for the purpose of removing aggregates to obtain a core particle emulsion having an average particle diameter of about 640 nm and having an evaporation residue of about 20%. The acid value of the particle calculated from the monomer composition is 292 mgKOH/g. The resultant core particle emulsion is for use in Examples 1 to 6. Hereinafter, the core particle emulsion is referred to as "core particle-1".

The average particle diameter is a value measured with a particle diameter analyzer (FPAR-1000 (trade name), manufactured by Otsuka Electronics Co., Ltd.). The apparatus measures a particle diameter using dynamic light scattering by directly observing scattering light from particles of the core particle emulsion obtained above. The acid value was calculated from the monomer composition, and the obtained acid value was used as the acid value for the copolymer constituting the core particle.

A core particle emulsion for comparison was obtained in the manner as described below. First of all, 0.5 pars of n-dodecyl mercaptan, 60 parts of methyl methacrylate (MMA), and 40 parts of methacrylic acid (m-AAc) were stirred and mixed with 150 parts of water, 1 part of a sodium polyoxyethylene alkyl ether sulfate (number of moles of added EO chains of 18, number of carbon atoms of alkyl group of 12) (hereinafter, referred to as emulsifying agent B) to prepare an emulsified monomer mixture. The core particle emulsion was prepared in the same manner as in the above-described preparation of "core particle-1" except that the resultant emulsified monomer mixture was used. The obtained core particle emulsion is for use in Comparative Examples. Hereinafter, the core particle emulsion is referred to as "core particle for comparison".

(2) Preparation of Seed Particle Emulsion Having Core-Shell Structure

Alkali-swellable seed particle emulsions each having a core-shell structure in which the core particle is covered with a shell layer having a non-alkali-swellable outermost layer (shell layer 2) formed using a hydrophobic monomer were each prepared using the core particle-1 or the core particle for comparison, which was prepared previously, in the manner as described below.

The seed particle emulsion for use in Example 1 was prepared in the manner as described below.

(Formation of Shell Layer)

First of all, 35 parts of methyl methacrylate (MMA), 5 parts of butyl methacrylate (BMA), 8 parts of butyl acrylate (BA), and 2 parts of methacrylic acid (m-AAc) were stirred and mixed with 50 parts of water and 0.5 parts of the above-described emulsifying agent B to prepare an emulsified monomer mixture for synthesizing shell layer 1. Hereinafter, the emulsified monomer mixture is referred to as emulsified monomer mixture for shell 1. Moreover, 50 parts of styrene (ST) were stirred and mixed with 50 parts of water and 0.5 parts of the above-described emulsifying agent B to prepare an emulsified monomer mixture for synthesizing shell layer 2. Hereinafter, the emulsified monomer mixture is referred to as emulsified monomer mixture for shell 2.

A seed particle emulsion for use in Examples having a core-shell structure was prepared using the core particle-1 prepared previously and the two kinds of the emulsified monomer mixtures prepared above by the method described below. First of all, in a 2 L four-necked round bottom flask equipped with a stirrer, a thermometer, and a reflux condenser, 900 parts of water and 20 parts of the emulsion of the core particle-1 in terms of the solid content were placed, and the temperature was raised to 85° C. while the air inside was replaced with nitrogen under stirring. Then, 0.5 parts of potassium persulfate were added as a polymerization initiator thereto and dissolved while keeping the internal temperature at 85° C., and after dissolving the potassium persulfate, the emulsified monomer mixture for shell 1 previously prepared was dropped and reacted over about one hour. After the completion of the addition of the emulsified monomer mixture for shell 1, the emulsified monomer mixture for shell 2 previously prepared was dropped and reacted over about 1 hour.

(Swelling Treatment with Alkali)

Further, after the completion of the addition, swelling treatment with an alkali was performed. Specifically, 8 parts of 25% ammonia water were added in the round bottom flask to make the pH 7.0 or higher, and the resultant mixture was left to stand at an internal temperature of 90° C. for about 2 hours. The average particle diameter before and after swelling treatment with an alkali was measured taking out a sample for measurement sometimes during leaving the mixture to stand. The average particle diameter was given as an average value of particle diameters of 10 particles, the particle diameters each measured from an image of a particle (SEM image) taken with a scanning electron microscope (JSM-6510 (trade name) manufactured by JEOL, Ltd.). As a result, an alkali-swellable seed particle emulsion having an average particle diameter before swelling treatment with an alkali of 970 nm, an average particle diameter after swelling treatment with an alkali of 1720 nm, an alkali swelling ratio of 458(%), and an evaporation residue of about 10% was prepared. The particle after being swollen with an alkali is referred to as "seed particle-1". It is to be noted that the alkali swelling ratio is a value calculated from the following formula.

Alkali swelling ratio (%)={(Average particle diameter after particle is swollen with alkali)$^3$/(average particle diameter before particle is swollen with alkali)$^3$−1}×100

A seed particle emulsion for use in Comparative Example 1 was prepared entirely in the same manner as in the preparation of the "seed particle-1" except that the "core particle-1" used above was changed to the "core particle for comparison" prepared previously. The obtained seed particle emulsion for use in Comparative Example 1 is referred to as "seed particle for comparison". This particle had an average particle diameter before the swelling treatment with an alkali of 460 nm, an average particle diameter after the swelling treatment with an alkali of 650 nm, and an alkali swelling ratio of 182(%).

(3) Preparation of Aqueous Gel-Encapsulating Resin Particle Emulsion

An emulsified monomer mixture for forming a resin layer to be the outermost layer of the particle was prepared in advance by mixing 100 parts of styrene (ST) with 100 parts of water and 0.5 parts of the emulsifying agent B. Subsequently, a resin layer to be the outermost layer was formed at the surface of the shell layer that constitutes the seed particle using the "seed particle-1" or the "seed particle for comparison" in the manner as described below to obtain an aqueous gel-encapsulating resin particle emulsion comprising: an alkali-swellable core portion; and a resin portion encapsulating the core portion and having a non-alkali-swellable outermost layer of the particle, the outermost layer formed using a hydrophobic monomer.

Specifically, first of all, 130 parts of water were placed in a 2 L round bottom flask equipped with a stirrer, a thermometer, and a reflux condenser, the previously prepared seed particle-1 being an alkali-swellable seed particle emulsion having an evaporation residue of about 10% were then placed therein in an amount of 100 parts in terms of the solid content, and the temperature was raised to 90° C. while the air inside was replaced with nitrogen under stirring. Then, 0.5 parts of potassium persulfate were added as a polymerization initiator thereto and dissolved while keeping the internal temperature at 90° C., and after dissolving the potassium persulfate, the emulsified monomer mixture for forming a resin layer to be the outermost layer of the particle, which was prepared in advance through stirring and mixing, was dropped into the round bottom flask over about 2 hours to conduct reaction. After the completion of dropping, the reaction mixture was left to stand for about 2 hours. Thereafter, the reaction mixture was cooled to room temperature to prepare an aqueous gel-encapsulating resin particle emulsion having an average particle diameter of 2.60 µm and an evaporation residue of about 15%.

(4) According to the above-described method, aqueous gel-encapsulating resin particle emulsions for use in Examples 7 to 10 and Comparative Examples 2 and 3 each having a different average particle diameter as shown in Table 1 were obtained. Aqueous gel-encapsulating resin particle emulsions for use in coating liquids for forming an intermediate layer were each prepared using respective aqueous gel-encapsulating resin particle emulsions by adjusting the solid concentration to be 15% by adding water.

<<Aqueous Emulsion of Hydrophobic Polymer being Binder Resin>>

Styrene-butadiene polymer latex (solid concentration of 50%, glass transition point of 13° C.) was used.

<<Coating Liquid for Forming Intermediate Layer>>

Coating liquids for forming an intermediate layer each having a solid concentration of 20% were each prepared using each of the aqueous gel-encapsulating resin particle emulsions for Examples and Comparative Examples obtained above and the styrene-butadiene polymer latex by mixing and stirring 600 parts of the aqueous gel-encapsulating resin particle emulsion and 100 parts of the styrene-butadiene polymer latex.

[Preparation of Coating Liquid for Forming Undercoat Layer>>

A composition consisting of 100 parts of calcined kaolin (Ansilex-93, manufactured by Engelhard), 40 parts of styrene-butadiene polymer latex (solid concentration of 50%, glass transition point of 13° C.), 30 parts of an aqueous solution containing 15% of completely saponified PVA (trade name: POVAL 105, molecular weight of 500, manufactured by KURARAY CO., LTD.), and 140 parts of water was mixed and stirred to prepare a coating liquid for forming an undercoat layer.

[Formation of Intermediate Layer]

In heat-sensitive recording paper of Examples 1 and 4 to 8 and Comparative Examples 1 to 3, an intermediate layer was formed by applying each of the coating liquids for forming an intermediate layer on wood free paper of 65 g/m² (product name: Hakugin) manufactured by NIPPON PAPER PAPYLIA CO., LTD. so that the weight of the coating liquid applied was 4 g/m² after drying. In addition, in Example 2, an intermediate layer was formed by applying a coating liquid for forming an intermediate layer on the wood free paper so that the weight of the coating liquid applied was 2 g/m² after drying, and in Example 3, an intermediate layer was formed by applying a coating liquid for forming an intermediate layer on the wood free paper so that the weight of the coating liquid applied was 8 g/m² after drying. In Comparative Examples 4 and 5, an intermediate layer was not provided.

[Formation of Heat-Sensitive Color Forming Layer]

The coating liquids 1 and 2 for forming a heat-sensitive color forming layer were each applied on the intermediate layers so that the weight of the coating liquid applied was 4 g/m² after drying to form heat-sensitive color forming layer with respective coating liquids to obtain two kinds of heat-sensitive recording paper each having a different heat-sensitive color forming layer for Examples 1 to 4, 7, and 8 and Comparative Examples 1 to 3. Further, in Comparative Example 5, an intermediate layer was not provided, and heat-sensitive color forming layers were formed by applying each of the coating liquids 1 and 2 for forming a heat-sensitive color forming layer so that the weight of the coating liquid applied was 4 g/m² after drying for each coating liquid to obtain heat-sensitive recording paper for comparison.

[Formation of Heat-Sensitive Recording Paper with Undercoat Layer]

The configuration in the heat-sensitive recording paper of Example 4 was such that an undercoat layer was provided between the base paper and the intermediate layer of Example 1. Specifically, heat-sensitive recording paper was obtained entirely in the same manner as in Example 1 except that the coating liquid for forming an undercoat layer was applied so that the weight of the coating liquid applied was 8 g/m² after drying. In addition, heat-sensitive recording paper of Comparative Example 4 in which the intermediate layer was not provided in the configuration of Example 4 was obtained for comparison.

[Formation of Heat-Sensitive Recording Paper with Protective Layer]

Heat-sensitive recording paper with a protective layer of Example 5 was obtained in such a way that the 3rd heat-sensitive color forming layer was provided in place of the 1st heat-sensitive color forming layer and the 2nd heat-sensitive color forming layer in Example 1 so that the weight applied was 3 g/m² after drying, and thereafter a protective layer was further provided thereon so that the weight applied was 2 g/m² after drying.

[Formation of Heat-Sensitive Recording Paper with Undercoat Layer and Protective Layer]

Heat-sensitive recording paper with an undercoat layer and a protective layer of Example 6 was obtained entirely in the same manner as in Example 5 except that a coating liquid for forming an undercoat layer was applied between the base paper and the intermediate layer in the heat-sensitive recording paper of Example 5 so that the amount of the coating liquid applied was 8 g/m² after drying.

[Preparation of Heat-Sensitive Paper of Examples 1 to 8 and Comparative Examples 1 to 5]

Smoothing treatment was performed on each piece of heat-sensitive recording paper of Examples 1 to 10 and Comparative Example 1 to 5, which was obtained by forming respective layers as described above, with a super calender to prepare heat-sensitive recording paper for evaluation.

[Evaluation]

A recording property and a printing property were evaluated by conducting various tests described below using heat-sensitive recording paper of Examples 1 to 8 and Comparative Examples 1 to 5. Obtained evaluation results are shown in Table 1 together.

<<Methods for Evaluating Performance>>

(1) Average Particle Diameter ϕ of Hollow Particle in Intermediate Layer

A median diameter was measured using a laser diffraction-scattering type particle size distribution measuring machine manufactured by MicrotracBEL Corp. with a measurement module MT 3300 EXII and a sample circulating device SDC 200 ml under the conditions of measurement conditions: default settings, solvent: water (refractive index=1.31), particle shape: non-spherical shape (refractive index=1.81), number of times of measurement: Avg/2, measuring time: 10 seconds, and measuring range: 0.021 to 2000 μm, and the value of the median diameter was used to determine the average particle diameter ϕ.

(2) Percentage of Hollowness (%)

In the hollow particles used in Examples and Comparative Examples, an average maximum particle diameter of 10 hollow particles was determined from surface observation (SEM) through electron micrograph observation, and further, the thickness of a resin portion (shell) was determined from transmissive observation (TEM). Subsequently, the percentage of hollowness was obtained from these values using the following calculation formula assuming that the particle has a spherical shape. The hollow particle of Example 1 had a percentage of hollowness of 81%. Moreover, the thickness of the resin portion (shell) of this hollow particle determined with the TEM was 0.07 μm.

Percentage of hollowness (%)={(average maximum particle diameter measured with SEM−thickness of shell resin portion determined with TEM×2)$^3$/(average maximum particle diameter measured with SEM)$^3$}×100

As shown in Table 1, the particle diameters determined by the observation with the SEM were observed to be slightly smaller than the average particle diameters φ described previously because of the difference in the measuring method. In Comparative Example 3, almost 90% of the particles could not maintain the hollows and were crushed into a bowl-like shape when the hollow particles were observed with the SEM. The diameter of the particles which were not crushed and maintained the hollows is described in Table 1. Accordingly, it is considered that the shape of most of the particles was changed into a bowl-like shape in the step of making the intermediate layer.

(4) Recording Property of Heat-Sensitive Recording Paper (Sensitivity)

Recording was performed on the obtained heat-sensitive recording paper using a label printer BP-4000 manufactured by Ishida Co., Ltd. with a dot density: 12 dots/mm at a printing speed: 325 mm/sec, and in the recording, printing energy was lowered in stages by 10% for each stage, where the maximum energy was assumed to be 100%. The optical density at each energy level was measured and determined with a densitometer "SpectroEye LT" (trade name) manufactured by X-Rite Inc. Whether the sensitivity is good or bad was evaluated by the optical density when the recording was performed with 50% energy, and the results are shown in Table 1. That is, in the case where a value of the optical density shown in Table 1 is relatively large, it is indicated that a high-quality image having a high optical density was obtained with a high sensitivity at a low thermal energy.

(5) Print Strength

Recording was performed on the obtained heat-sensitive recording paper with an RI printability tester to evaluate the print strength according to the occurrence of dry pick (peeling of paper) or not. Specifically, recording was performed with a tackiness of ink of 15 and a weight of an ink placed of 0.7 g/m$^2$, and the degree of occurrence of picking (fluffing of paper and peeling of paper which occur during printing) on the printed face was observed to perform three-grade evaluation of the print strength according to the criteria as described below.

A: Neither fluffing of paper nor peeling of paper is observed at all.

B: fluffing of paper is recognized but is at a level that causes no problem in practical use.

C: Peeling of paper is recognized.

TABLE 1

Results showing properties and recording property of hollow particle contained in intermediate layer

| | Coating weight of intermediate layer | Physical properties of hollow particle | | | | Recording property (recording density) Heat-sensitive color forming layer used | | | Printability Surface strength against RI |
| --- | --- | --- | --- | --- | --- | --- | --- | --- | --- |
| | | Average particle diameter | Diameter determined with SEM | Percentage of hollowness | | | | | |
| | (g/m$^2$) | φ (μm) | (μm) | (%) | Additional layer(s) | 1st | 2nd | 3rd | printing |
| Example 1 | 4 | 2.60 | 2.1 | 81 | — | 1.20 | 0.86 | — | A |
| Example 2 | 2 | 2.60 | 2.1 | 81 | — | 1.15 | 0.81 | — | A |
| Example 3 | 8 | 2.60 | 2.1 | 81 | — | 1.26 | 0.95 | — | B |
| Example 4 | 4 | 2.60 | 2.1 | 81 | Undercoat layer | 1.34 | 1.05 | — | A |
| Example 5 | 4 | 2.60 | 2.1 | 81 | Protective layer | — | — | 1.07 | A |
| Example 6 | 4 | 2.60 | 2.1 | 81 | Undercoat layer & protective layer | — | — | 1.24 | A |
| Example 7 | 4 | 2.24 | 2.0 | 73 | — | 1.18 | 0.81 | — | A |
| Example 8 | 4 | 1.96 | 1.9 | 68 | — | 1.08 | 0.66 | — | A |
| Comparative Example 1 | 4 | 1.23 | 1.0 | 55 | — | 0.85 | 0.48 | — | A |
| Comparative Example 2 | 4 | 0.90 | 0.9 | 45 | — | 0.70 | 0.40 | — | A |
| Comparative Example 3 | 4 | 3.75 | 3.3 | 91 | — | 0.47 | 0.31 | — | B |
| Comparative Example 4 | 0 | — | — | — | Undercoat layer | 0.69 | 0.40 | — | A |
| Comparative Example 5 | 0 | — | — | — | — | 0.46 | 0.30 | — | A |

<<Evaluation Results>>

The average particle diameters and the percentages of hollowness for the hollow particles investigated in Examples and Comparative Examples 1 to 3 are roughly classified into the following three groups.

Group A (Comparative Examples 1 and 2): average particle diameter of 0.8 to 1.4 μm, percentage of hollowness of 40 to 60%

Group B (Examples): average particle diameter of 1.5 to 3.5 μm, percentage of hollowness of 60 to 85%

Group C (Comparative Example 3): average particle diameter of 3.6 μm or larger, percentage of hollowness of 90% or more Results of Investigating Each Group With respect to the heat-sensitive recording paper of Comparative Examples in the group A where the hollow particles are used in the intermediate layer, the enhancement of sensitivity for the image to be obtained is difficult to achieve when compared to Examples, but the printability was good.

With respect to the heat-sensitive recording paper of Examples in the group B where the hollow particles are used in the intermediate layer, the image for which both the enhancement of sensitivity and the printability are achieved was obtained.

With respect to the heat-sensitive recording paper of Comparative Example in the group C where the hollow particle is used in the intermediate layer, the measurement of the particle diameter was able to be conducted; however, the heat insulating property was lowered and the sensitivity was also lowered because almost 90% of the particles were not formed into a hollow particle and the shape thereof was changed into a bowl-like shape.

Furthermore, the hollow particles in the group B are each a hollow particle having the characteristics as specified in the present invention, and it was found that when they were used in the intermediate layer of the heat-sensitive recording body, an image of high sensitivity can be obtained with a smaller weight applied than in Comparative Examples 1 and 2, as shown in Example 2. Moreover, from the comparison among the cases where the heat-sensitive recording paper of Example 1, of Example 8, and of Comparative Example 1 were used, it was shown that not only increasing the percentage of hollowness of the hollow particle but also increasing the average particle diameter is important for a high-speed recording property. However, when the particle diameter becomes excessively large as shown in Comparative Example 3, poor dot reproducibility and lowering of the strength of the intermediate layer occur. Therefore, it is considered that the range as specified in the present invention is most suitable.

The invention claimed is:

1. A heat-sensitive recording body comprising:
a support;
an intermediate layer; and
a heat-sensitive color forming layer,.
wherein the heat-sensitive color forming layer comprises as main components:
   a leuco dye; and
   a developer,
the intermediate layer and the heat-sensitive color forming layer are stacked on the support in this order,
the intermediate layer comprises a hollow particle,
the hollow particle comprises:
   a hollow core portion; and
   a resin portion,
   wherein the hollow core portion is formed by drying a solvent in an alkali-swellable aqueous gel,
   the alkali-swellable aqueous gel comprises: a (meth)acrylic-based copolymer having an acid value in a range from 200 to 400 mgKOH/g,
   the (meth)acrylic-based copolymer is a copolymer formed from a monomer mixture comprising:
      (a1) a $C_{1-3}$ aliphatic alkyl (meth)acrylate;
      (a2) a carboxyl group-containing monomer; and
      (a3) at least one monomer selected from the group consisting of n-amyl (meth)acrylate, isoamyl (meth)acrylate, n-octyl (meth)acrylate, isooctyl (meth)acrylate, isononyl (meth)acrylate, lauryl (meth)acrylate, tetrahydrofurfuryl (meth)acrylate, cyclohexyl (meth)acrylate, 3,3,5-trimethylcyclohexyl (meth)acrylate, cyclodecyl (meth)acrylate, cyclodecylmethyl (meth)acrylate, benzyl (meth)acrylate, phenyl (meth)acrylate, phenoxyethyl (meth)acrylate, and isobornyl (meth)acrylate,
   the resin portion encapsulates the core portion and has a non-alkali-swellable layer as an outermost layer of the hollow particle, wherein the non-alkali-swellable outermost layer is formed from a material comprising a hydrophobic monomer, and
the hollow particle has an average particle diameter in a range from 1.5 to 3.5 µm and a percentage of hollowness in a range from 60 to 85%.

2. The heat-sensitive recording body according to claim 1, wherein the intermediate layer is formed by preparing a mixture, as a coating liquid, applying the coating liquid onto the support, and thereafter drying the solvent,
the mixture comprising:
   an aqueous gel-encapsulating resin particle emulsion; and
   an aqueous emulsion of a hydrophobic polymer being a binder resin, and
the resin portion encapsulates the aqueous gel that encapsulates the solvent and forms the hollow core portion after the drying of the solvent.

3. The heat-sensitive recording body according to claim 2, wherein the hydrophobic polymer is at least one polymer selected from the group consisting of styrene-acrylic copolymers, styrene-butadiene copolymers, styrene-butadiene-acrylic copolymers, acrylonitrile-butadiene copolymers, ethylene-vinyl acetate copolymers, vinyl chloride-vinyl acetate copolymers, vinyl acetate-acrylic copolymers, acrylic copolymers, vinyl acetate resins, and polyurethane resins.

4. The heat-sensitive recording body according to claim 1, wherein the intermediate layer is formed by preparing a mixture, as a coating, applying the coating liquid onto the support, and thereafter drying the solvent,
the mixture comprises:
   an aqueous gel-encapsulating resin particle emulsion; and
   an aqueous emulsion of a water-soluble polymer being a binder resin,
the resin portion encapsulates the aqueous gel that encapsulates the solvent and forms the hollow core portion after the drying of the solvent, and
the outermost layer of the resin portion is formed of a resin having a crosslinked structure.

5. The heat-sensitive recording body according to claim 4, wherein the water-soluble polymer is at least one polymer selected from the group consisting of polyvinyl alcohol and derivatives thereof, starch and derivatives thereof, hydroxymethyl cellulose, hydroxyethyl cellulose, hydroxypropyl cellulose, methyl cellulose, ethyl cellulose, sodium polyacrylate, polyvinylpyrrolidone, acrylamide-acrylic acid ester copolymers, acrylamide-acrylic acid ester-methacrylic acid ester copolymers, styrene-maleic anhydride copolymers, isobutylene-maleic anhydride copolymers, casein, and gelatin, and derivatives thereof.

6. The heat-sensitive recording body according to claim 1, wherein the intermediate layer has a thickness in a range from 2 to 20 $g/m^2$.

7. The heat-sensitive recording body according to claim 1, further comprising a protective layer,
wherein the protective layer comprises: as a main component, a water-soluble polymer, or an aqueous emulsion of a hydrophobic polymer, or a combination thereof, and
the protective layer is stacked on the heat-sensitive color forming layer.

8. The heat-sensitive recording body according to claim 1, further comprising an undercoat layer mainly comprising an inorganic pigment,
wherein the undercoat layer is placed between the support and the intermediate layer.

* * * * *